US008824895B2

(12) United States Patent
Shinada et al.

(10) Patent No.: US 8,824,895 B2
(45) Date of Patent: Sep. 2, 2014

(54) RADIO-ON-FIBER UNIT AND RADIO-ON-FIBER SYSTEM

(75) Inventors: Satoshi Shinada, Tokyo (JP); Tetsuya Kawanishi, Tokyo (JP); Shinya Nakajima, Tokyo (JP)

(73) Assignee: National Institute of Information and Communications Technology, Tokyo (JP)

( * ) Notice: Subject to any disclaimer, the term of this patent is extended or adjusted under 35 U.S.C. 154(b) by 906 days.

(21) Appl. No.: 13/001,883

(22) PCT Filed: Jul. 3, 2008

(86) PCT No.: PCT/JP2008/001753
§ 371 (c)(1),
(2), (4) Date: Dec. 29, 2010

(87) PCT Pub. No.: WO2010/001438
PCT Pub. Date: Jan. 7, 2010

(65) Prior Publication Data
US 2011/0103800 A1    May 5, 2011

(51) Int. Cl.
*H04B 10/00* (2013.01)
*H01Q 21/06* (2006.01)
*H04B 10/2575* (2013.01)

(52) U.S. Cl.
CPC ............ *H01Q 21/061* (2013.01); *H01Q 21/006* (2013.01); *H04B 10/25756* (2013.01)
USPC .......................................... 398/116; 398/115

(58) Field of Classification Search
USPC ......... 398/115, 116, 117, 118, 121, 125, 140, 398/164
See application file for complete search history.

(56) References Cited

U.S. PATENT DOCUMENTS 4,864,312 A * 9/1989 Huignard et al. ............. 342/375
2008/0128618 A1* 6/2008 Rahman et al. ............... 250/332

FOREIGN PATENT DOCUMENTS

JP    2001-053542 A    2/2001

OTHER PUBLICATIONS

International Search Report mailed on Oct. 7, 2008 for the corresponding International patent application No. PCT/JP2008/001753.

* cited by examiner

*Primary Examiner* — M. R. Sedighian
(74) *Attorney, Agent, or Firm* — Posz Law Group, PLC

(57) ABSTRACT

An object of the present invention is to provide a radio-on-fiber unit and a radio-on-fiber system which can transmit/receive signals at adequate rates especially, to/from a mobile device. A first aspect of the present invention relates to a radio-on-fiber unit (3) which includes an antenna array (1) and a light modulator array (2). The light modulator array (2) comprises antenna elements (5) and light modulators (7) that are connected with the respective antenna elements via electric circuits. The optical waveguide (13) is composed of linear optical waveguides (13) that are arranged along the light modulators (7) included in certain lines among the light modulators (7). The light modulator array (2) comprises reflection units (17) for connecting two adjacent linear optical waveguides with each other. Consequently, a signal light inputted to a light input unit (11) is outputted from a light output unit (15) via each linear optical waveguide (13).

9 Claims, 14 Drawing Sheets

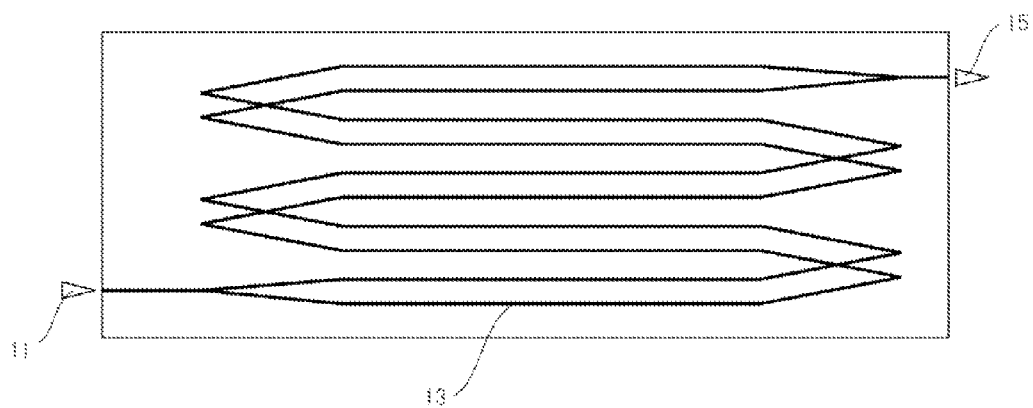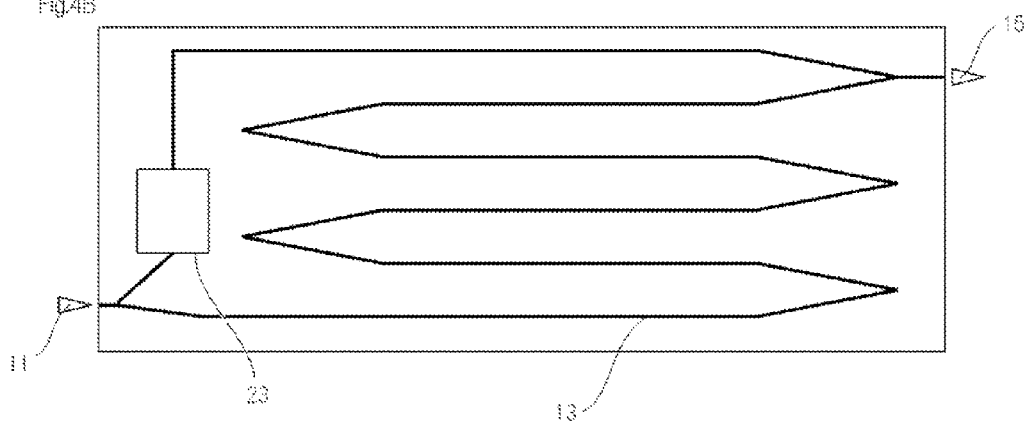

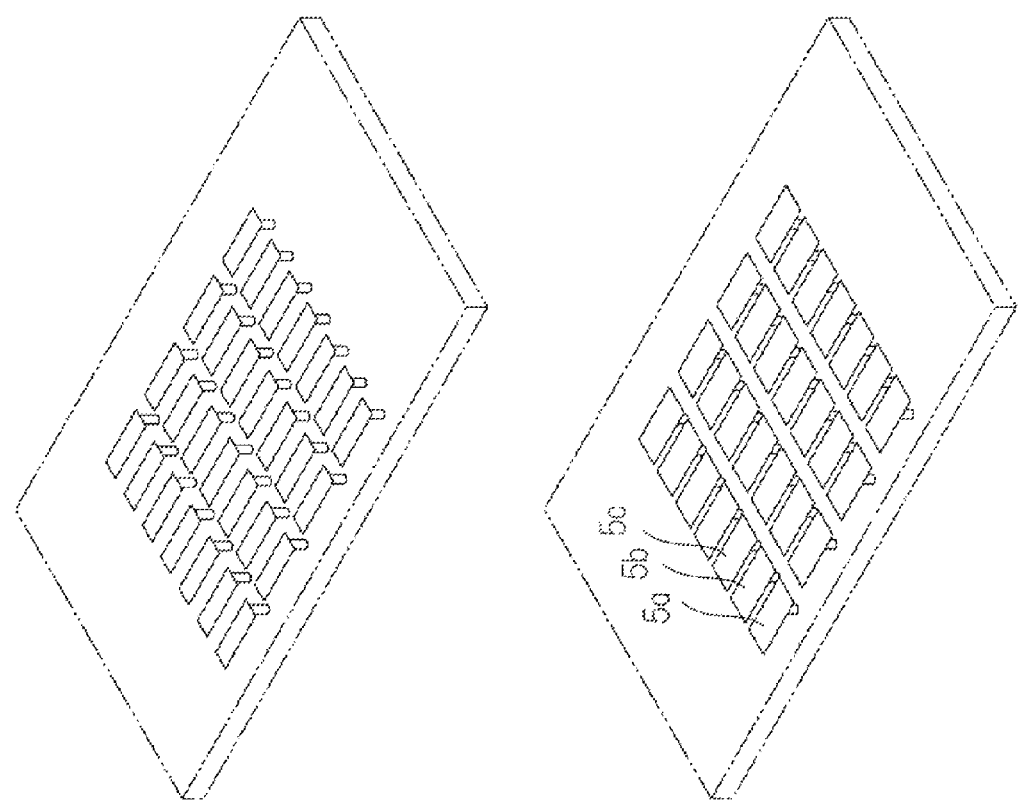

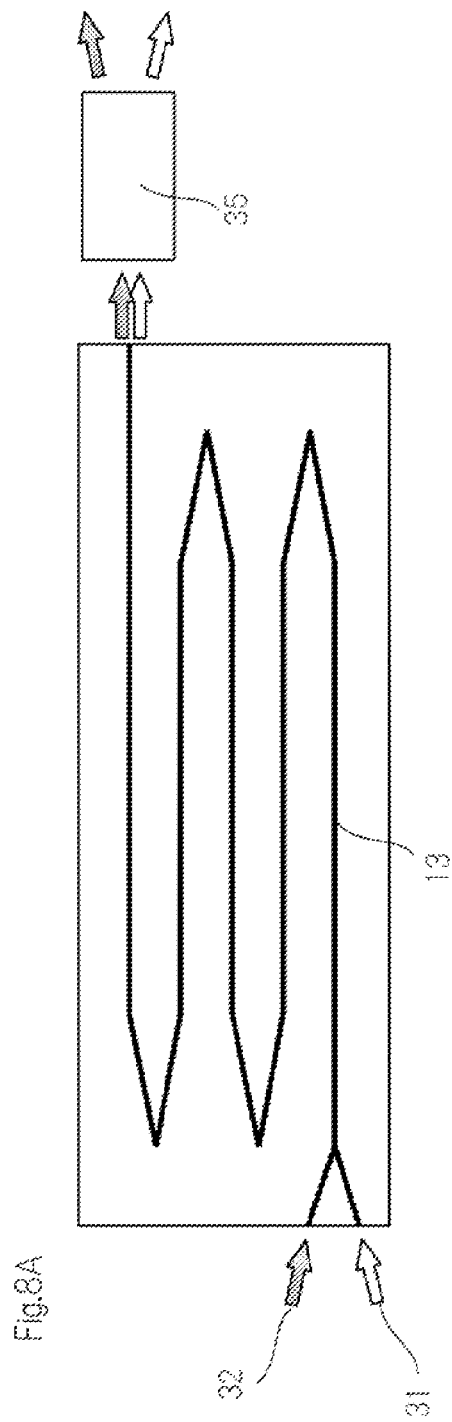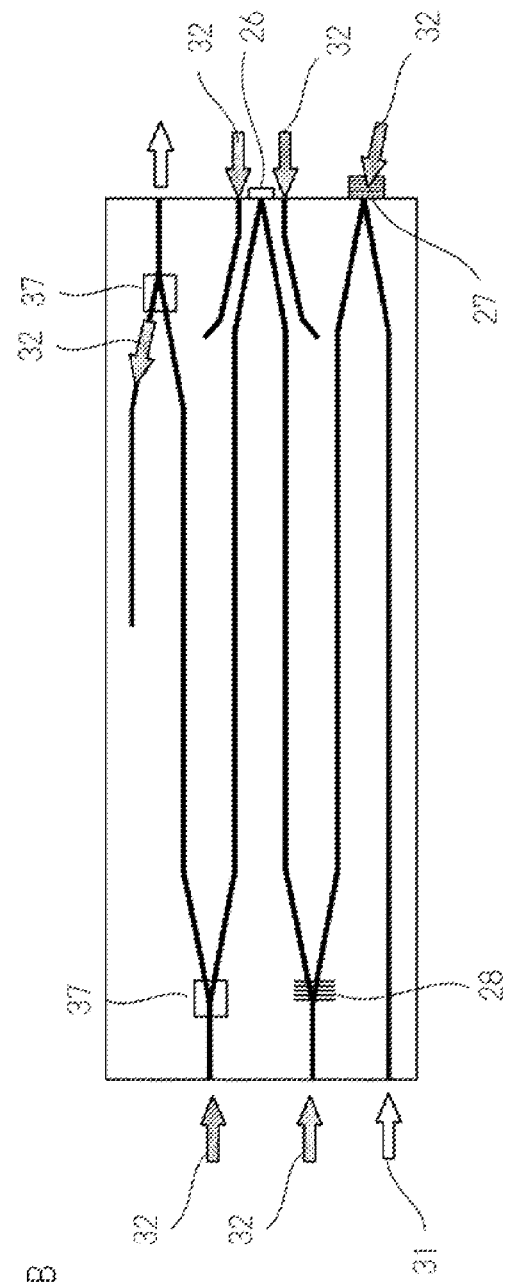

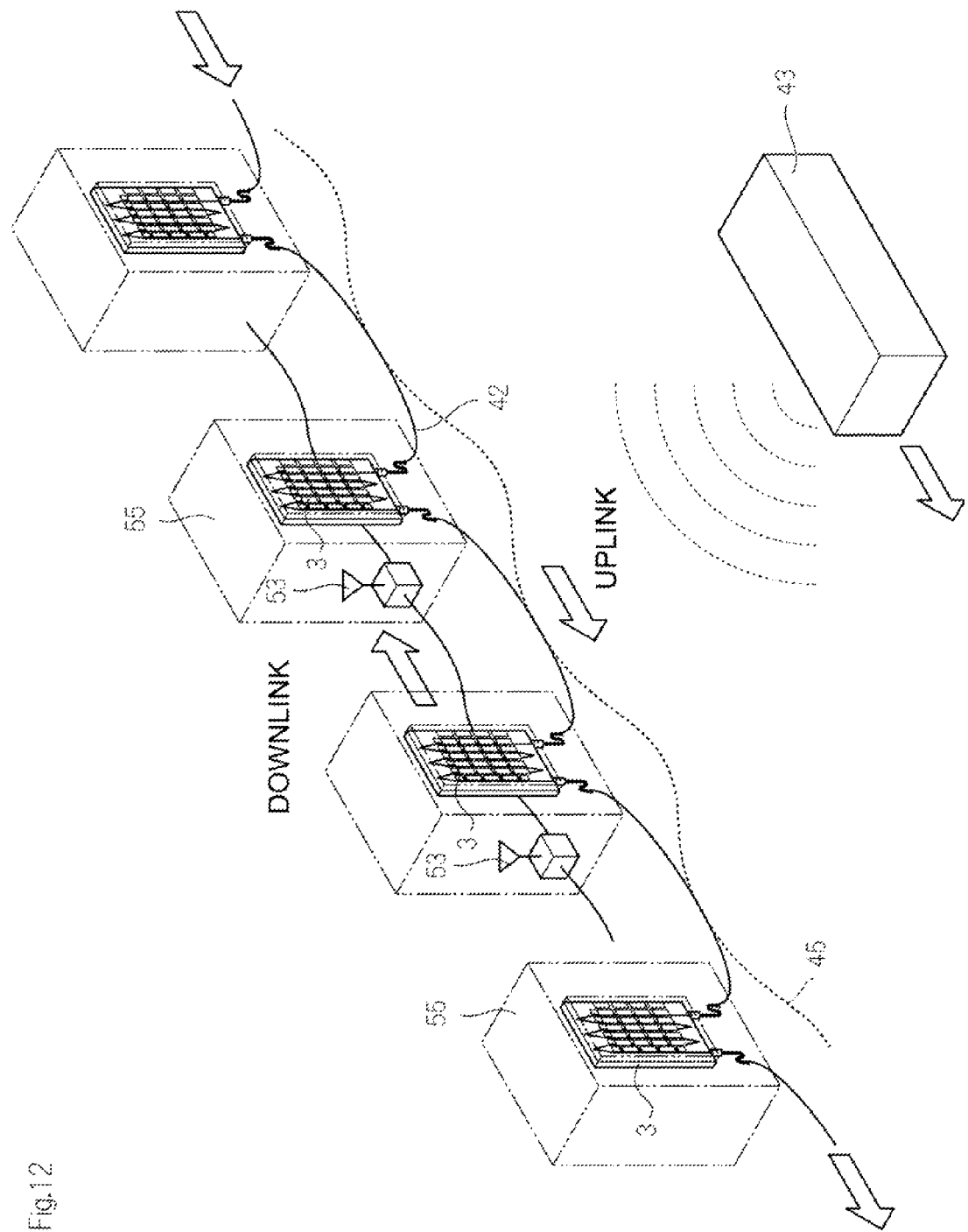

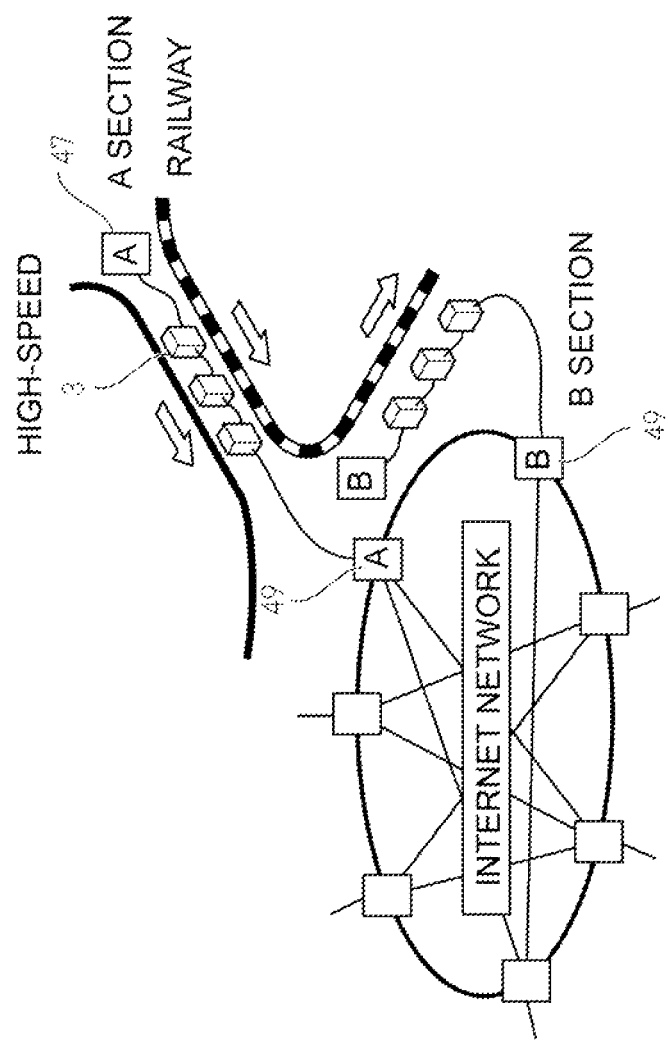

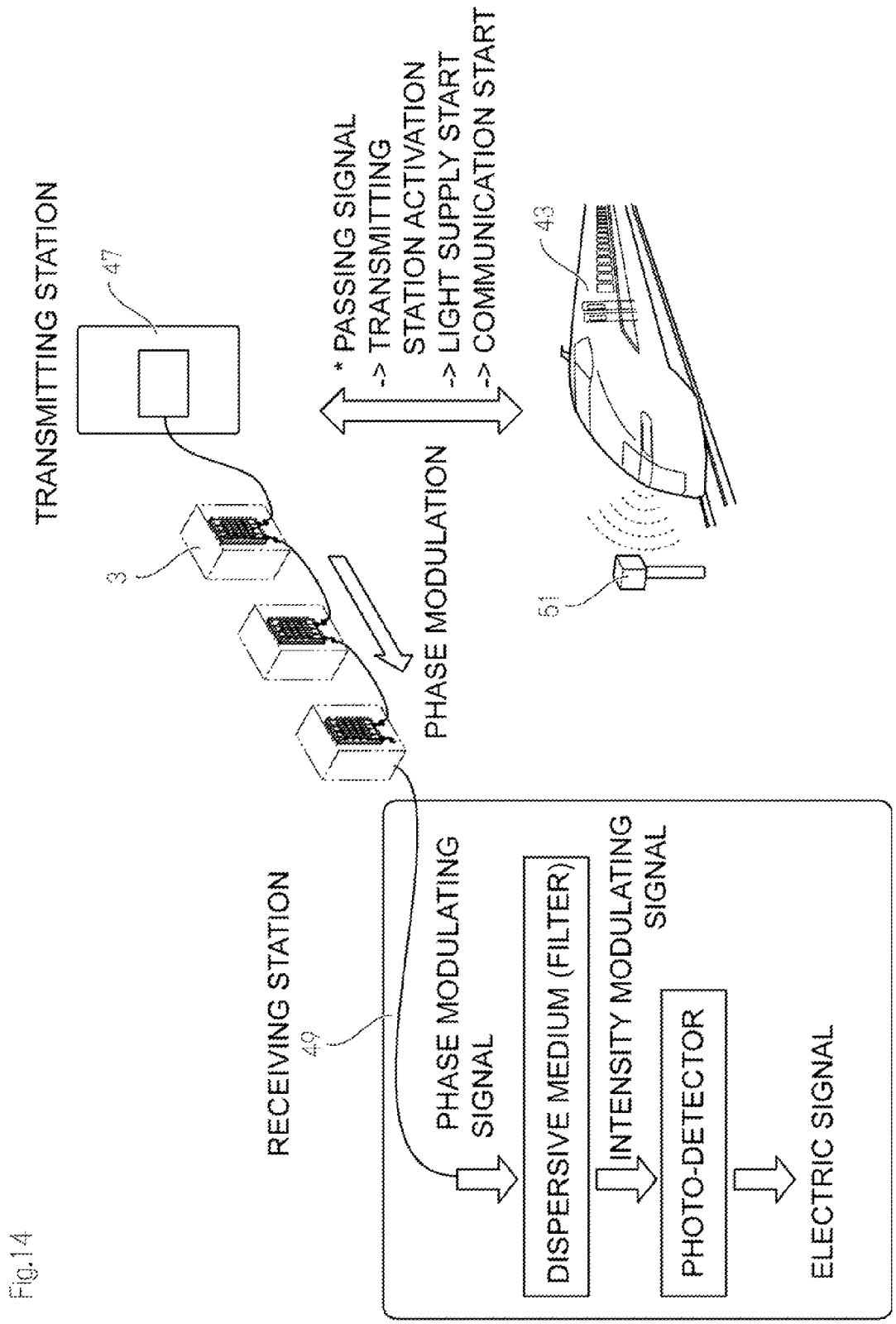

RADIO-ON-FIBER UNIT AND RADIO-ON-FIBER SYSTEM

TECHNICAL FIELD

The present invention, for example, relates to a radio-on-fiber unit.

BACKGROUND ART

In an optical fiber radio system, development of interface technology that mutually converts a millimeter wave signal and an optical signal is important. Particularly in an uplink, a received feeble millimeter wave signal is first electrically amplified and then a laser or modulator is operated and problems such as a complex configuration of each base station and increased installation costs and power consumption are caused, projecting bottlenecks for widespread use thereof. Thus, Japanese Patent Application Laid-Open No. 2001-53542 discloses an antenna apparatus that converts a radio wave signal into an optical signal before reception or converts an optical signal into a radio wave signal before transmission.

However, the antenna apparatus disclosed by Patent Document 1 includes several series antenna elements. That is, Patent Document 1 does not intend to be used for a large-scale system and thus, it is difficult to use the antenna apparatus in a wireless LAN for mobile units. More specifically, Patent Document 1 does not establish the configuration of a large-scale array, connection technology between an antenna and an optical converter array, and optical loss compensation technology of a multi-stage light modulator and includes several series antenna elements.

Patent Document 1: Japanese Patent Application Laid-Open No. 2001-53542

DISCLOSURE OF THE INVENTION

Problems to be Solved by the Invention

An object of the present invention is to provide a radio-on-fiber unit and a radio-on-fiber system capable of transmitting and receiving signals at adequate rates, particularly to and from a mobile unit.

Means for Solving the Problems

A first aspect of the present invention relates to a radio-on-fiber unit (3) which contains an antenna array (1) and a light modulator array (2).

The antenna array (1) includes a plurality of antenna elements (5) arranged two-dimensionally. The light modulator array (2) includes a plurality of light modulators (7) connected to the plurality of respective antenna elements (5) via electric circuits. The light modulator (7) is preferably connected to the corresponding antenna element (5) via an electric circuit which has a phase compensator (6). An antenna array layer (10) is provided in a layer formed on a substrate (9) and an antenna element is preferably electrically connected with a feeding unit (25) provided in the substrate (9) via a contact hole provided in the antenna array layer (10).

The light modulator array (2) includes the substrate (9), a light input unit (11), an optical waveguide (13), a light output unit (15), and a plurality of light modulators (7). The substrate (9) is provided in parallel with the antenna array layer (10) in which the plurality of antenna elements (5) is provided. The light input unit (11) is a site through which a signal light is input into the substrate (9). The optical waveguide (13) is a site through which a signal light input from the light input unit (11) propagates and is provided in the substrate (9). The light output unit (15) is a site from which a signal light after propagating through the optical waveguide (13) is output. The plurality of light modulators (7) is provided in the optical waveguide (13).

The plurality of light modulators (7) is arranged with the feeding points (25) of the respective light modulators (7) in corresponding positions of the plurality of antenna elements (5). The optical waveguide (13) includes, among the plurality of light modulators (7), a plurality of linear optical waveguides (13) along the light modulator (7) contained in some line.

The light modulator array (2) further includes a reflection unit (17) to connect two adjacent linear waveguides. Accordingly, a signal light input into the light input unit (11) is output from the light output unit (15) via each linear optical waveguide (13).

A second aspect of the present invention relates to a radio-on-fiber system which includes the radio-on-fiber unit (3) in the first aspect of the present invention. The radio-on-fiber unit (3) in any mode in the present specification can be adopted for the radio-on-fiber system. More specifically, a radio-on-fiber system having a plurality of radio-on-fiber units provided along a railway line, wherein the radio-on-fiber units adjacent to each other are optically connected, wherein a radio signal transmitted from a mobile unit traveling on the railway line can be received to change the received signal into a light modulating signal, predetermined information can wirelessly be transmitted to the mobile unit traveling on the railway line, each radio-on-fiber unit of the plurality of radio-on-fiber units is a radio-on-fiber unit containing an antenna array (1) including a plurality of antenna elements (5) arranged two-dimensionally and a light modulator array (2) including a plurality of light modulators (7) connected to the plurality of respective antenna elements (5) via electric circuits, wherein the light modulator array (2), comprising: a substrate (9) provided in parallel with an antenna array layer (10) where the plurality of antenna elements (5) is provided; a light input unit (11) to input a signal light into the substrate (9); an optical waveguide (13) through which the signal light input from the light input unit (11) propagates and which is provided in the substrate (9); an light output unit (15) from which the signal light after propagating through the optical waveguide (13) is output; and a plurality of light modulators (7) provided in the optical waveguide (13), the plurality of light modulators (7) is arranged with the feeding points (25) of the respective light modulators (7) in corresponding positions of the plurality of antenna elements (5), the optical waveguide (13) includes, among the plurality of light modulators (7), a plurality of linear optical waveguides (13) along the light modulator (7) contained in some line, and the light modulator array (2), further comprising: a reflection unit (17) to connect two adjacent linear waveguides, wherein the signal light input into the light input unit (11) is output from the light output unit (15) via each linear optical waveguide (13).

Effects of the Invention

According to the present invention, a radio-on-fiber unit and a radio-on-fiber system capable of transmitting/receiving signals at adequate rates, particularly to/from a mobile unit, can be provided.

BEST MODE FOR CARRYING OUT THE INVENTION

An exemplary embodiment of the present invention will be described below using drawings. FIG. 1 is a conceptual diagram exemplifying a radio-on-fiber unit of the present invention. FIG. 2 shows a conceptual diagram when an antenna array and a light modulator array are spatially separated.

As shown in FIGS. 1 and 2, a radio-on-fiber unit of the present invention includes the antenna array (1) and the light modulator array (2).

The antenna array (1) includes a plurality of antenna elements (5) arranged two-dimensionally. In the example shown in FIGS. 1 and 2, the respective antenna elements (5a, 5b, 5c, . . . ) are arranged like a two-dimensional lattice. For each antenna element, an antenna element disclosed by Japanese Patent Application Laid-Open No. 2001-53542 can suitably be used.

The light modulator array (2) includes a plurality of light modulators (7). The respective light modulators (7) are connected to the corresponding antenna elements (5) via electric circuits having the phase compensator (6). The phase compensator is publicly known. With the phase compensator, timing of an optical signal and an electric signal received by an antenna can be controlled. The phase compensator is provided on the side of the light modulator in the example shown in FIG. 2. However, the phase compensator may be provided on the side of the antenna array. An electric circuit disclosed by Japanese Patent Application Laid-Open No. 2001-53542 may suitably be used as an electric circuit.

More specifically, as described in Japanese Patent Application Laid-Open No. 2001-53542, an antenna array in which n (n is a positive integer equal to 2 or greater) antenna elements are equally arranged on a straight line, n opto-electric/electric-optic conversion units (light modulators) connected to the first to the n-th antenna elements in the antenna array via electric circuits respectively, and an optical transmission path that passes through the first to the n-th opto-electric/electric-optic conversion units at equal intervals are provided, wherein circuit characteristics of the first to the n-th electric circuits may be set so that circuit characteristics of the electric circuit connecting the x-th (x is any integer satisfying 2≤x≤n) opto-electric/electric-optic conversion unit and antenna element and circuit characteristics of the electric circuit connecting the (x−1)-th opto-electric/electric-optic conversion unit and antenna element satisfy the relation $\Delta\phi_E+\Delta\phi_P=2\pi\cdot d\cdot\sin\theta/\lambda=2\pi N$ ($\Delta\phi_E$: difference of phase delays of high-frequency signals generated by the x-th electric circuit and the (x−1)-th electric circuit, $\Delta\phi_P$: phase difference of high-frequency signals necessary to compensate for a transmit time difference $\Delta T$ for light to pass through an optical transmission path between the x-th opto-electric/electric-optic conversion unit and the (x−1)-th opto-electric/electric-optic conversion unit, d: interval between the x-th antenna element and (x−1)-th antenna element, θ: angle formed between a wave front of a reception wave or transmission wave and an antenna surface, λ: wavelength of an electric signal, N: any integer).

The light modulator array (2) includes the substrate (9), a light input unit (11), an optical waveguide (13), a light output unit (15), and a plurality of light modulators (7). The substrate (9) is provided in parallel with the antenna array layer (10) in which the plurality of antenna elements (5) is provided. The light input unit (11) is a site through which a signal light is input into the substrate (9). The optical waveguide (13) is a site through which a signal light input from the light input unit (11) propagates and is provided in the substrate (9). The optical waveguide itself provided in the substrate in this manner is publicly known. On the other hand, as shown in FIGS. 1 and 2, a waveguide of multi-stage turn-around type is used in the present invention. The waveguide of turn-around type has, for example, a plurality of stages of parallel portions and portions positioned at tip portions of the parallel portions and tapered to connect the adjacent parallel portions.

The light output unit (15) is a site from which a signal light after propagating through the optical waveguide (13) is output. The plurality of light modulators (7) is provided in the optical waveguide (13). The light modulator itself provided in the optical waveguide in this manner is publicly known. That is, the light modulator is enabled to perform modulation such as phase modulation and intensity modulation on a light propagating through the optical waveguide. As shown in FIGS. 1 and 2, the optical waveguide (13) includes, among the plurality of light modulators (7), a plurality of linear optical waveguides (13) along the light modulator (7) contained in some line. The waveguide includes a waveguide using a $LiNbO_3$ substrate or $LiTaO_3$ substrate and into which titanium is diffused. A waveguide using proton exchange may be used. A ridge waveguide may be used. Further, a waveguide combining these may be used. A radio-on-fiber unit in the present invention has a long propagation length and further has a reflection structure, leading to large optical losses. Thus, it is preferable to add a material that compensates for such losses to the optical waveguide to make compensation for losses by optical excitation. If, for example, a light of 1550 nm is used as a signal light, erbium (Er) known as an optical amplification atom in the 1550 nm band may be diffused into the optical waveguide or added in the stage of crystal growth. The waveguide of multi-stage turn-around type that reflects light by an optical waveguide multiplexing unit to turn around the light in plural stages is preferable as an optical waveguide. Accordingly, a large number of modulating electrodes (resonance type, traveling wave type) provided on the optical waveguide can be arranged or on a longer path so that a lower voltage is needed for driving because the length of interaction between light and electricity can be extended.

The light modulator includes an intensity modulator and a phase modulator. FIG. 3 is a diagram showing an example of the waveguide when a phase modulator is used as a light modulator. In FIG. 3, reference numeral 21 denotes a polarization/inversion region. Positive/negative signs in FIG. 3 show an example of a partial polarization/inversion region matching a turn-around waveguide. In the example shown in FIG. 3, a signal input into the light input unit (11) is phase-modulated by the phase modulator provided along the optical waveguide (13) when the signal propagates through the optical waveguide (13). The phase modulator is electrically connected to the antenna element (5). Then, the phase modulator performs phase modulation reflecting a feeble radio wave received by the antenna element (5) on the signal. With polarization/inversion regions provided on the optical waveguide, light modulation can be performed efficiently. Polarization/inversion regions are, for example, regions where the polarization direction of the substrate (direction of the crystal axis) is inverted. Polarization/inversion regions may be provided, for example, along straight line portions of the waveguide. As exemplified in FIG. 3, polarization/inversion regions may be provided only in lines whose line No. is an even number.

FIG. 4 is a diagram showing examples of the waveguide when an intensity modulator is used as a light modulator. FIG. 4A shows an example of the waveguide when a Mach-Zehnder waveguide is used. FIG. 4B shows an example of the intensity modulator when delay control is exercised. In FIG. 4B, reference numeral 23 is a delay controller. The working principle of an intensity modulator using a Mach-Zehnder optical waveguide and the working principle of an intensity modulator when delay control is exercised are publicly known. In both FIGS. 4A and 4B, modulation can be performed on an input signal in the same manner as the waveguide shown in FIG. 3.

FIG. 5 is a diagram showing examples of the antenna array. FIG. 5A is a diagram showing an example of a dipole antenna array. FIG. 5B is a diagram showing an example of a microstrip antenna array (MSA). A 7×4 dipole antenna array is exemplified in FIG. 5A. A 7×4 MSA array is exemplified in FIG. 5B. An antenna array of the present invention can adopt other numbers of rows and columns. The microstrip antenna (MSA) is a kind of flat panel antenna constructed by etching technology or the like with, for example, a plane circuit resonant element in a circular or rectangular shape on a printed circuit board with copper foil. That is, the antenna element according to the present specification includes a dipole antenna and a microstrip antenna. For example, antenna electrodes are arranged in a two-dimensional array by matching to the feeding points (25) of light modulating electrodes formed along the optical waveguide.

FIG. 6 is a diagram showing an example of a two-dimensional modulator array. FIG. 6A shows an example of a resonance type electrode array. FIG. 6B shows an example of a traveling wave type electrode array. Light modulating electrodes are formed in a two-dimensional array in an upper part of the optical waveguide therealong. Reference numeral 25 denotes a feeding point of a light modulating electrode. Light modulating electrodes including the phase compensator (6) are preferable before after the feeding point (25). For the light modulating electrode, a resonance type electrode structure enabling high-density lamination or a traveling wave type electrode structure capable of configuring a long electrode may be used.

The plurality of light modulators (7) is arranged with the feeding points (25) of the respective light modulators (7) in corresponding positions of the plurality of antenna elements (5). In this manner, light modulators compatible with corresponding antenna elements can be provided. Then, modulation corresponding to each antenna element can be performed on a signal propagating through the optical waveguide.

It is difficult to connect an antenna away and a light modulator array arranged two-dimensionally in the same plane. Thus, these arrays are installed in parallel in the present invention. Thus, the antenna array (1) and the light modulator array (2) formed monolithically on one substrate (9) is one of preferred modes of the present invention. That is, it is preferable to use the substrate of one of the antenna array (1) and the light modulator array (2) to form the other thereon. In this mode, the antenna array (1) and the light modulator array (2) form one circuit. By forming the antenna array (1) and the light modulator array (2) monolithically, some antenna array and the corresponding light modulator can electrically be connected easily. This mode includes lamination of the other layer on the substrate of an antenna substrate or the substrate (9). Specifically, a layer containing the light modulator array (2) may be laminated on the antenna substrate. The antenna array layer (10) may be laminated on the substrate (9) containing the light modulator array (2). More specifically, an optical waveguide and modulating electrodes are provided on a substrate of LiNbO₃ or the like. Thereafter, a layer of SiO₂ or resin is formed. Then, an antenna array is formed in an upper part of the layer. Contact holes are drilled in sites positioned at feeding points of the layer and each antenna is electrically connected through the contact holes.

The antenna array (1) may include an antenna array. In this case, the plurality of antenna elements (5) is provided in the antenna substrate. That is, the antenna substrate functions as the antenna array layer (10). Then, the antenna substrate and the substrate (9) are connected. Thus, an antenna substrate may be used as the antenna array layer (10) to connect the antenna substrate and the substrate (9). More specifically, each antenna element and the corresponding modulator are connected via an electric circuit. An example of the electric circuit may be one displayed by Japanese Patent Application Laid-Open No. 2001-53542. The electric circuit may contain a flat coaxial cable, bonding formed by flip chip bonding, or a thin film formed by wafer fusion.

The light modulator array (2) further includes the reflection unit (17) to connect two adjacent linear waveguides. Accordingly, a signal light input into the light input unit (11) is output from the light output unit (15) via each linear optical waveguide (13).

Examples of the reflection unit (17) include a metallic reflector, dielectric multiplayer reflector, and diffraction grating reflector provided on an end face of the substrate (9). FIG. 7 is a conceptual diagram of a reflection unit. FIG. 7A shows a metallic reflector. FIG. 7B shows a dielectric multiplayer reflector. FIG. 7C shows a diffraction grating reflector. These reflectors are publicly known and an optimum one may be adopted when necessary.

In the present invention, it is preferable to amplify an optical signal by inputting an excitation light into the optical waveguide. In this manner, a plurality of kinds of modulation can be performed on a signal propagating through a long optical waveguide. FIG. 8 is a diagram showing an example of the radio-on-fiber unit that inputs an excitation light into the optical waveguide. FIG. 8A shows an example of a single-path input waveguide. FIG. 8B shows an example of multi-path input.

In the example shown in FIG. 8A, a signal light (31) enters through the light input unit (11). On the other hand, there is a Y-shaped branch in the waveguide near the light input unit (11). One side of the Y-shaped branch is optically connected to a light source for excitation light. Thus, an excitation light (32) enters from one side of the Y-shaped branch. Then, the excitation light and the signal light are multiplexed. The signal light is, for example, a light having the wavelength of 1550 nm. In this case, for example, a crystal to which erbium is added if necessary can be used. Thus, by using the crystal to which erbium is added, a signal light can be amplified. On the other hand, the excitation light is, for example, a light having the wavelength of 980 nm or 1480 nm. In the example shown in FIG. 8A, the multiplexed signal light (31) and excitation light (32) are demultiplexed by a WDM coupler (35).

As shown in FIG. 8B, a preferred mode of the radio-on-fiber unit of the present invention is that the light modulator array (2) includes an optical system for excitation light to input an excitation light into the optical waveguide (13) via the reflection unit (17). With the optical system for excitation light, the amplification efficiency can be increased dramatically. Accordingly, the plurality of kinds of modulation can be performed by using a long optical waveguide with a plurality of light modulators.

The radio-on-fiber unit shown in FIG. 8B includes a plurality of optical systems to input an excitation light into the waveguide.

FIG. 9 is a diagram illustrating an operation to input an excitation light via the reflection unit. FIG. 9A is a diagram showing an example using a diffraction grating. FIG. 9B is a diagram showing an example using a dielectric multiplayer. FIG. 9C is a diagram showing an example using a metallic reflector and a directional coupler.

In the example using a diffraction grating, as shown in FIG. 9A, an excitation light input into a substrate from outside the substrate is input into a waveguide via the diffraction grating.

A signal light input into the diffraction grating, on the other hand, is changed in the traveling direction to the next line by some portion of the diffraction grating. For such an operation, the diffraction grating may be designed to turn around the signal light and transmit the excitation light. Such a design is publicly known and, for example, the slit spacing of the diffraction grating may be adjusted.

If, as shown in FIG. 9B, a dielectric multiplayer is used, an excitation light input from outside a substrate is input into a waveguide via the dielectric multiplayer. A signal light input into the dielectric multiplayer, on the other hand, is changed in the traveling direction to the next line by the dielectric multiplayer.

An example, as shown in FIG. 9C, using a metallic reflector and a directional coupler will be described. A metallic reflector (26) is provided on an end face of the substrate (9). Then, an edge of the waveguide (13) is designed so that a signal light reaches the metallic reflector (26). Thus, a signal light propagating through the waveguide (13) is reflected by the metallic reflector (26) to change its course to the next line of the waveguide. On the other hand, an optical system to input an excitation light into the substrate from outside the substrate is provided. An excitation light input into the substrate through the optical system is guided to the waveguide by the directional coupler (coupler). Then, the signal light is amplified before the excitation light and the signal light being multiplexed.

The above diffraction grating and dielectric multiplayer function as a wavelength selective filter.

FIG. 10 shows a portion of the radio-on-fiber unit when a wavelength division multiplexing (WDM) light is propagated. FIG. 10A shows a configuration example thereof. FIG. 10B shows a configuration example thereof. FIG. 10C shows an explanatory view of FIG. 10A and FIG. 10B. In this example, a plurality of wavelength dispersive media (41) is provided in the waveguide. Because wavelength dispersive media (41) are provided in the waveguide, adjustments can be made so that light of a specific wavelength is modulated. With this structure, light of wavelengths corresponding to characteristics of a radio signal such as the frequency and directionality can be selected and therefore, a simple multi-conversion to convert a plurality of signals with different directionality in radio communication into optical signals of different wavelengths in optical communication can be realized. The structure may be such that, as shown in FIG. 10A, the distance from the antenna array (5a, 5b, and 5c) to the feeding points (25) and the phase compensators (6) is different from antenna array to antenna array. The structure may be such that, as shown in FIG. 10B, the phase compensator is provided not only on the side of the light modulator via the feeding point (25), but also on the side of the antenna array.

FIG. 11 is a diagram exemplifying the radio-on-fiber unit of the present invention. As shown in FIG. 11, the light input unit and the light output unit may be provided on the same side.

Series Connection Configuration of Transmitting/Receiving Units

FIG. 12 is a diagram showing a series connection configuration example of transmitting/receiving units. The system shown in FIG. 12 is configured by connecting each transmitting/receiving unit (55) in which an antenna integrated light modulator array (the radio-on-fiber unit (3)) for uplink (from a mobile unit to an Internet network) and an antenna (53) for downlink (from an Internet network to a mobile unit) are housed using an optical fiber (42) of suitable length. The length of the optical fiber is, for example, between several meters to 100 m. FIG. 13 is a conceptual diagram of a radio-on-fiber system of the present invention. As shown in FIG. 13, the transmitting/receiving units (55) are arranged along the route of a fast mobile unit (43) and at intervals optimized for the speed of the mobile unit. Accordingly, seamless communication can be realized. In the system, a transmitting station (47) to transmit light to a fiber end and a receiving station (49) to receive a light signal modulated by each unit are provided and the receiving station is connected to an Internet network. As shown in FIG. 12, a Raman optical fiber (45) may be used together. Accordingly, Raman amplification can be performed on a light propagated through the optical fiber. FIG. 14 is a diagram showing an aspect of the transmitting station, units, and the receiving station. Reference numeral 51 in FIG. 14 is a device that detects communication of a mobile unit.

Configuration (WDM Multiplexing Technology and Introduction of Optical Excitation/Amplification Technology) of the Transmitting Station (for Uplink)

The transmitting station includes a continuous wave oscillation (CW) light source of, for example, 1550 nm band and outputs light toward the receiving station. Since wavelength multiplexing technology that uses the waveband effectively is used together, a multiwavelength light source may be adopted as the transmitting light source. The wavelength multiplexing may also be used for the purpose of compensating for light that is not modulated due to a shift caused by the Doppler shift of the radio signal frequency from a mobile unit by light of a different wavelength. The transmitting station may also include an excitation light source for Er excitation or Raman amplification. A signal light is amplified by using these excitation light sources. A fiber for a Raman amplifier is preferably provided in parallel with a fiber to connect a light modulator array with an antenna to multiplex a signal light and an excitation light in an appropriate position for amplification of the signal light.

Configuration (Passive Unit Technology) of the Receiving Station (for Uplink)

When the light modulator is configured by a phase modulator, it is preferable to arrange a dispersive medium (such as FBG and a band-pass filter) before a photo-detector of the receiving station to convert phase modulation into intensity modulation. Accordingly, each radio-on-fiber unit (3) is configured by a phase modulator that eliminates the need for bias adjustments (does not need the power supply), which leads to reduced unit introduction costs and reduced power consumption.

Activation Control of the Transmitting/Receiving Stations from a Mobile Unit

The transmitting station is instantaneously activated upon receipt of a passing signal of a mobile unit and starts to supply light. For example, a network is established only in a section in which a mobile unit is present and stops in other sections. This makes power consumption efficient. After continuous light being transmitted from the transmitting station, the connected radio-on-fiber unit (3) operates, due to a passive operation, only with power transmitted from a mobile unit to modulate light. The receiving station is also instantaneously activated upon receipt of an initial pilot signal to start reception of a modulating signal. The system can also be used for monitoring position information and the traveling speed of the Shinkansen.

As shown in FIG. 14, a preferred mode of the present invention is to observe passing of a mobile unit by using a passing detection device (51). That is, the passing detection device observes passing of a mobile unit and activates only the transmitting station and the transmitting/receiving units (55) in a section that needs to be activated. By activating/ stopping the system in accordance with the position of a mobile unit in this manner, power consumption can be reduced.

In a radio-on-fiber system of the present invention, continuous light is output from the transmitting station (47) toward the first radio-on-fiber unit (3). The continuous light becomes a signal light. That is, continuous light becomes a signal light having various kinds of information by performing various kinds of light modulation on the continuous light. If synchronization is possible, a pulsed light may naturally be used. The passing detection device (51) detects passing of the mobile unit (43) such as a Shinkansen, train, and vehicle. Then, a control device (not shown) such as a computer activates the system (the transmitting station and the transmitting/receiving units (55)) in a section where the mobile unit is present. Antenna elements contained in the radio-on-fiber unit (3) receive a radio signal emitted from the mobile unit (43). The received radio signal is conveyed to light modulators electrically connected to the respective antenna elements. Then, modulation in accordance with the received radio signal is performed on a signal light. The signal light is modulated in this manner and thus, information in accordance with the radio signal can be provided to the signal light. The signal light is multiplexed with an excitation light if necessary for amplification. The radio-on-fiber units (3) are connected by an optical fiber and the signal light propagates to the next radio-on-fiber unit (3). Also in the next radio-on-fiber unit (3), modulation in accordance with the received radio signal is performed on the signal light. Then, the signal light propagates to the receiving station (49) after propagating through a certain number of the radio-on-fiber units (3). The receiving station (49) is connected to an Internet network and thus reads modulation information added to the signal light by the radio-on-fiber units (3) and outputs the information to the Internet network.

On the other hand, information received from the Internet is received by the receiving station (49) and conveyed to the radio-on-fiber unit (3). Then, the information is transmitted to a mobile terminal contained in the mobile unit (43) from the antenna (53) provided in the radio-on-fiber unit (3) as a radio signal.

INDUSTRIAL APPLICABILITY

The present invention may be used in the field of information communication technology.

BRIEF DESCRIPTION OF THE DRAWINGS

FIG. 4 is a diagram showing examples of the waveguide when an intensity modulator is used as a light modulator. FIG. 4A shows an example of the waveguide when a Mach-Zehnder waveguide is used.

FIG. 4B shows an example of the intensity modulator when delay control is exercised.

FIG. 5 is a diagram showing examples of the antenna array. FIG. 5A is a diagram showing an example of a dipole antenna array. FIG. 5B is a diagram showing an example of a microstrip antenna array.

FIG. 6 is a diagram showing an example of a two-dimensional modulator array.

FIG. 7 is a conceptual diagram of a reflection unit.

FIG. 8 is a diagram showing an example of the radio-on-fiber unit that inputs an excitation light into the optical waveguide. FIG. 8A shows an example of a single-path input waveguide. FIG. 8B shows an example of multi-path input.

FIG. 9 is a diagram illustrating an operation to input an excitation light via the reflection unit.

FIG. 10 shows a portion of the radio-on-fiber unit when a wavelength division multiplexing (WDM) light is propagated.

FIG. 12 is a diagram showing a series connection configuration example of transmitting/receiving units.

FIG. 13 is a conceptual diagram of a radio-on-fiber system of the present invention.

FIG. 14 is a diagram showing an aspect of a transmitting station, units, and a receiving station.

DESCRIPTION OF SYMBOLS

Figure 1:
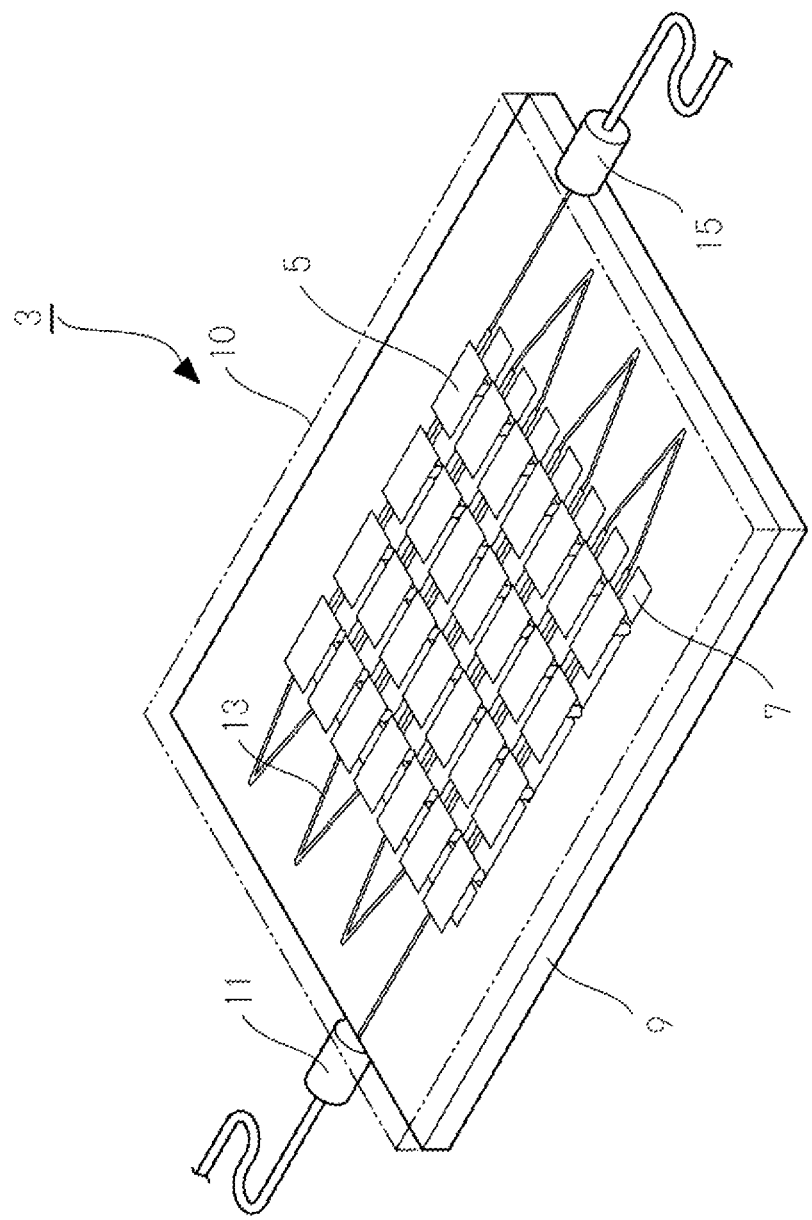
FIG. 1 is a conceptual diagram exemplifying a radio-on-fiber unit of the present invention.
Figure 2:
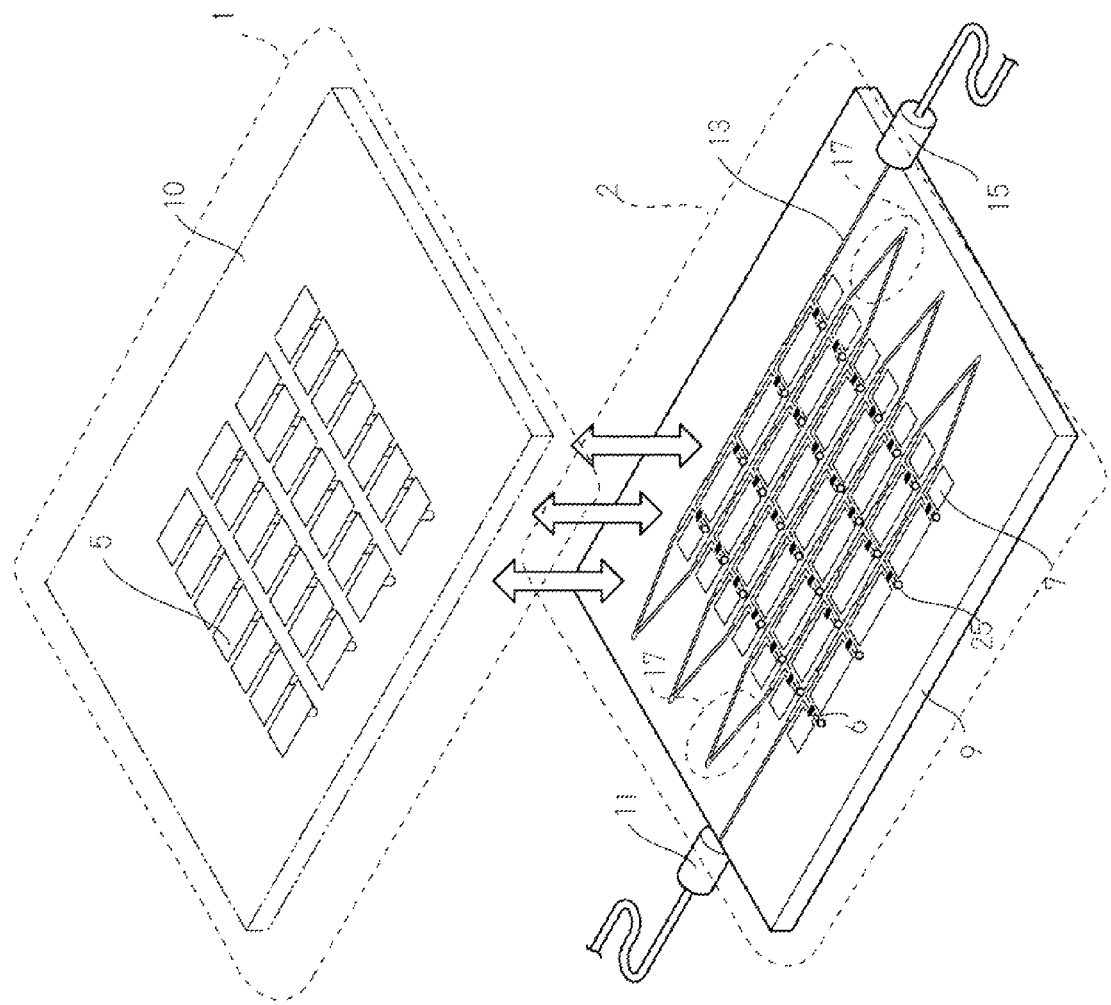
FIG. 2 shows a conceptual diagram when an antenna array and a light modulator array are spatially separated.
Figure 3:
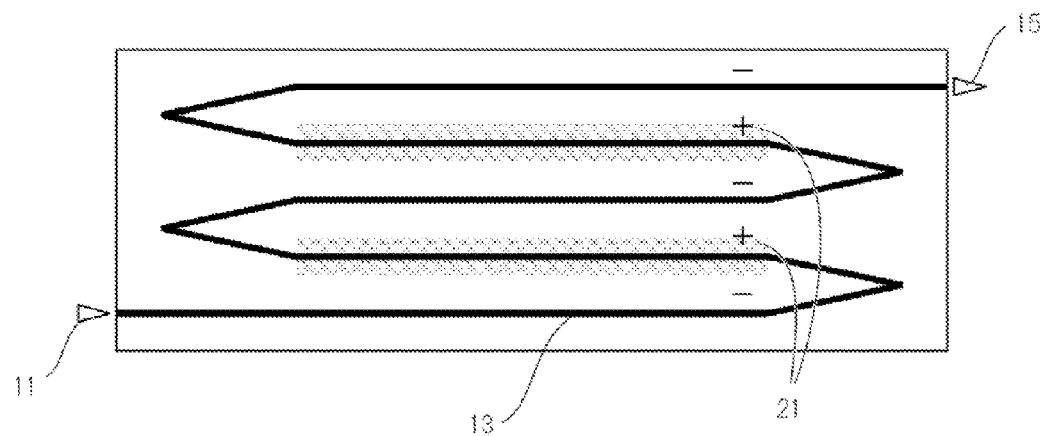
FIG. 3 is a diagram showing an example of a waveguide when a phase modulator is used as a light modulator.
Figure 6A:
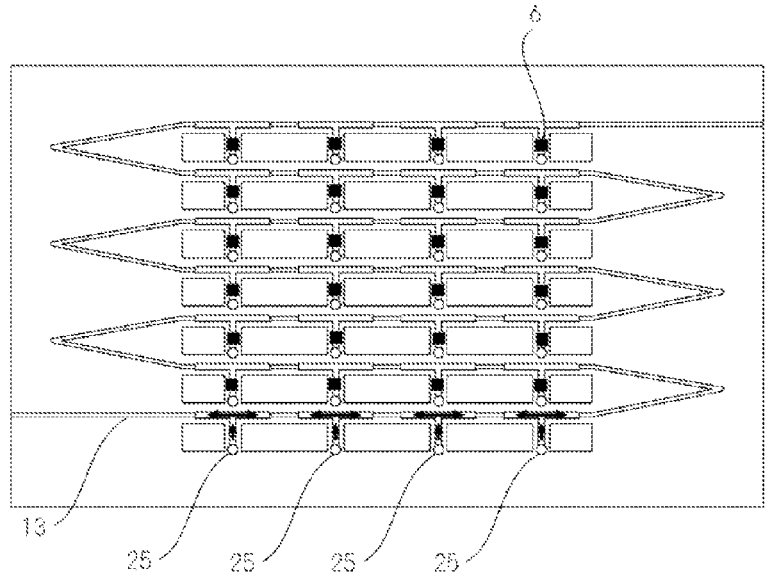
FIG. 6A shows an example of a resonance type electrode array.
Figure 6B:
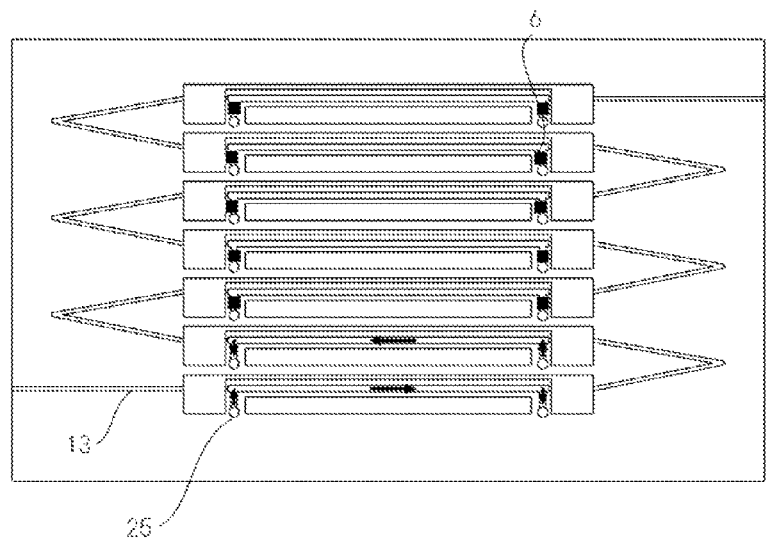
FIG. 6B shows an example of a traveling wave type electrode array.
Figure 7A:
FIG. 7A shows a metallic reflector.
Figure 7B:
FIG. 7B shows a dielectric multiplayer reflector.
Figure 7C:
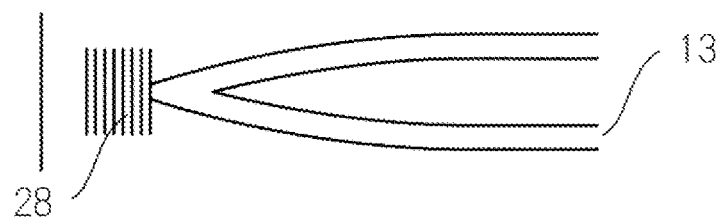
FIG. 7C shows a diffraction grating reflector.
Figure 9A:
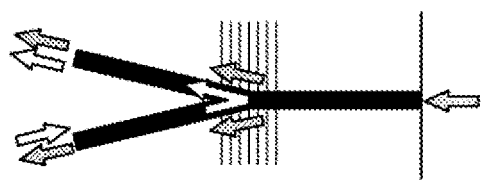
FIG. 9A is a diagram showing an example using a diffraction grating.
Figure 9B:
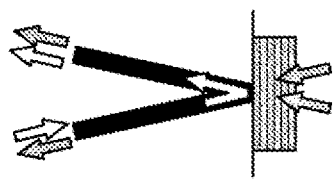
FIG. 9B is a diagram showing an example using a dielectric multiplayer.
Figure 9C:
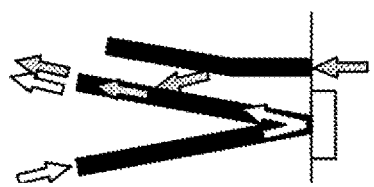
FIG. 9C is a diagram showing an example using a metallic reflector and a directional coupler.
Figure 10A:
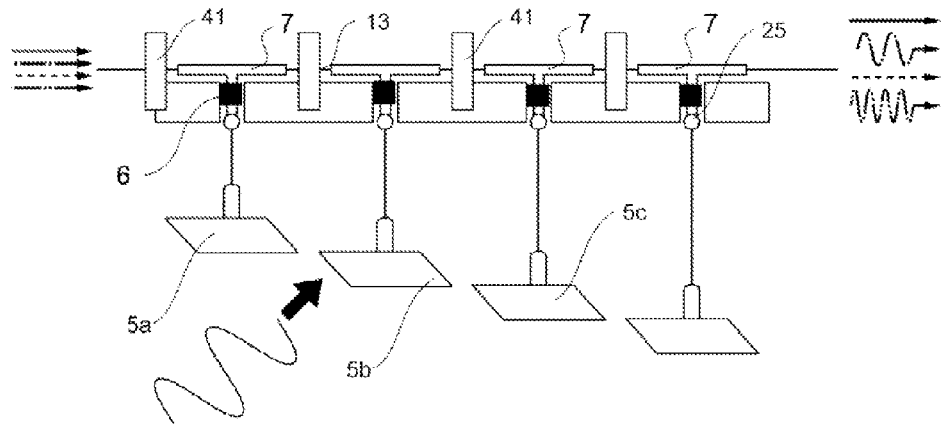
FIG. 10A shows a configuration example thereof.
Figure 10B:
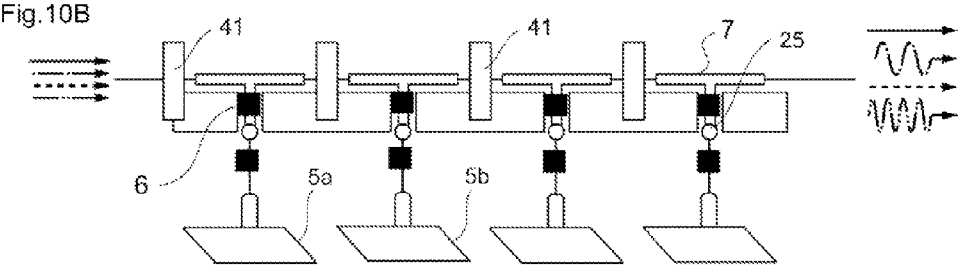
FIG. 10B shows a configuration example thereof.
Figure 10C:
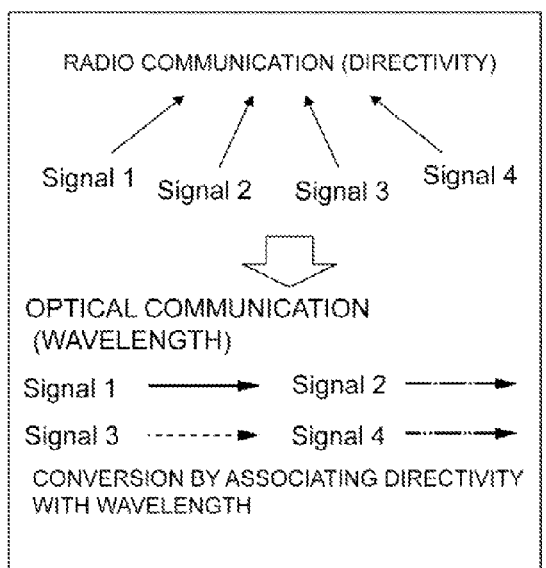
FIG. 10C shows an explanatory view of FIG. 10A and FIG. 10B.
Figure 11:
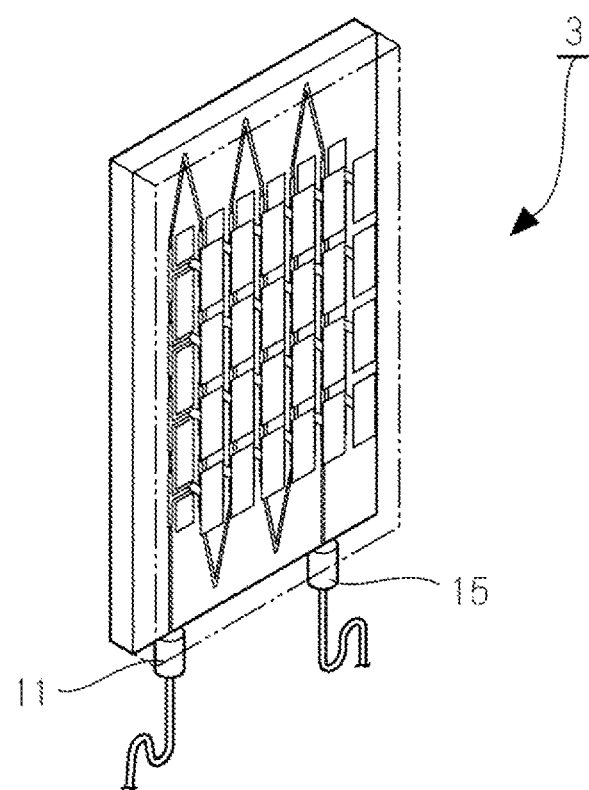
FIG. 11 is a diagram exemplifying the radio-on-fiber unit of the present invention.

1 Antenna array
2 Light modulator array
3 Radio-on-fiber unit
5 Antenna element
7 Light modulator
9 Substrate
10 Antenna array layer
11 Light input unit
13 Optical waveguide
15 Light output unit
17 Reflection unit
25 Feeding point

The invention claimed is:

1. A radio-on-fiber unit comprising an antenna array including a plurality of antenna elements arranged two-dimensionally and a light modulator array including a plurality of light modulators connected to the plurality of respective antenna elements via electric circuits, wherein
the light modulator array, comprising:
a substrate provided in parallel with an antenna array layer where the plurality of antenna elements is provided;
a light input unit to input a signal light into the substrate;
an optical waveguide through which the signal light input from the light input unit propagates and which is provided in the substrate;
a light output unit from which the signal light after propagating through the optical waveguide is output; and
a plurality of light modulators provided in the optical waveguide,
wherein the plurality of light modulators is arranged with the feeding points of the respective light modulators in corresponding positions of the plurality of antenna elements, wherein the optical waveguide comprises, among the plurality of light modulators, a plurality of linear optical waveguides along the light modulator contained in some line, and wherein the light modulator array, further comprises:

a reflection unit to connect two adjacent linear waveguides, thereby the signal light input into the light input unit is output from the light output unit via each linear optical waveguide, wherein each linear optical waveguide includes a respective polarization/inversion region.

2. The radio-on-fiber unit according to claim 1, wherein each of the light modulators is connected to one of the corresponding antenna elements via an electric circuit having a phase compensator.

3. The radio-on-fiber unit according to claim 1, wherein the antenna array includes an antenna substrate, wherein the plurality of antenna elements is provided in the antenna substrate, and wherein the electric circuit comprises:

a flat coaxial cable, bonding formed by flip chip bonding, or a thin film formed by wafer fusion.

4. The radio-on-fiber unit according to claim 1, wherein the reflection unit is a metallic reflector, a dielectric multiplayer reflector, or a diffraction grating reflector provided on an end face of the substrate.

5. The radio-on-fiber unit according to claim 1, wherein the light modulator array further comprises:

an optical system for excitation light to input an excitation light into the optical waveguide via the reflection unit, wherein the optical system for excitation light comprises a wavelength selective filter provided in the reflection unit and, wherein the wavelength selective filter reflects the signal light, and transmits the excitation light.

6. The radio-on-fiber unit according to claim 1, wherein the light modulator array further comprises:

an optical system for excitation light to input an excitation light into the optical waveguide via the reflection unit, wherein the optical system for excitation light includes a diffraction grating provided in the reflection unit, the diffraction grating reflects the signal light, and transmits the excitation light.

7. The radio-on-fiber unit according to claim 1, wherein the light modulator array further comprises:

a directional coupler and a second optical system for excitation light to input an excitation light into the optical waveguide, wherein the excitation light inputs into the optical waveguide via the second optical system for excitation light and combines with the signal light via the directional coupler.

8. A radio-on-fiber unit comprising an antenna array including a plurality of antenna elements arranged two-dimensionally and a light modulator array including a plurality of light modulators connected to the plurality of respective antenna elements via electric circuits, wherein the light modulator array, comprising:

a substrate provided in parallel with an antenna array layer where the plurality of antenna elements is provided;

a light input unit to input a signal light into the substrate;

an optical waveguide through which the signal light input from the light input unit propagates and which is provided in the substrate;

a light output unit from which the signal light after propagating through the optical waveguide is output; and a plurality of light modulators provided in the optical waveguide, wherein the plurality of light modulators is arranged with the feeding points of the respective light modulators in corresponding positions of the plurality of antenna elements, wherein the optical waveguide comprises, among the plurality of light modulators, a plurality of linear optical waveguides along the light modulator contained in some line, and wherein the light modulator array, further comprises:

a reflection unit to connect two adjacent linear waveguides, thereby the signal light input into the light input unit is output from the light output unit via each linear optical waveguide, wherein an antenna array layer is formed in a layer provided on the substrate, and wherein one of the plurality of antenna elements is electrically connected to a feeding unit provided in the substrate via a contact hole provided in the antenna array layer.

9. A radio-on-fiber system having a plurality of radio-on-fiber units provided along a railway line, wherein the radio-on-fiber units adjacent to each other are optically connected, wherein a radio signal transmitted from a mobile unit traveling on the railway line can be received to change the received signal into a light modulating signal, predetermined information can wirelessly be transmitted to the mobile unit traveling on the railway line, each radio-on-fiber unit of the plurality of radio-on-fiber units is a radio-on-fiber unit containing an antenna array including a plurality of antenna elements arranged two-dimensionally and a light modulator array including a plurality of light modulators connected to the plurality of respective antenna elements via electric circuits, wherein the light modulator array, comprising:

a substrate provided in parallel with an antenna array layer where the plurality of antenna elements is provided;

a light input unit to input a signal light into the substrate;

an optical waveguide through which the signal light input from the light input unit propagates and which is provided in the substrate;

an light output unit from which the signal light after propagating through the optical waveguide is output; and a plurality of light modulators provided in the optical waveguide, the plurality of light modulators is arranged with the feeding points of the respective light modulators in corresponding positions of the plurality of antenna elements, the optical waveguide includes, among the plurality of light modulators, a plurality of linear optical waveguides along the light modulator contained in some line, and the light modulator array, further comprising:

a reflection unit to connect two adjacent linear waveguides, wherein the signal light input into the light input unit is output from the light output unit via each linear optical waveguide.

* * * * *